United States Patent
Wilson et al.

(10) Patent No.: US 11,840,462 B2
(45) Date of Patent: Dec. 12, 2023

(54) SWITCHABLE SYSTEM FOR HIGH-SALINITY BRINE DESALINATION AND FRACTIONAL PRECIPITATION

(71) Applicants: Massachusetts Institute of Technology, Cambridge, MA (US); Battelle Energy Alliance, LLC, Idaho Falls, ID (US)

(72) Inventors: Aaron D. Wilson, Idaho Falls, ID (US); John Lienhard, Lexington, MA (US); Akshay Deshmukh, Cambridge, MA (US); Zi Hao Foo, Cambridge, MA (US)

(73) Assignees: Massachusetts Institute of Technology, Cambridge, MA (US); Battelle Energy Alliance, LLC, Idaho Falls, ID (US)

( * ) Notice: Subject to any disclaimer, the term of this patent is extended or adjusted under 35 U.S.C. 154(b) by 103 days.

(21) Appl. No.: 17/567,809

(22) Filed: Jan. 3, 2022

(65) Prior Publication Data
US 2022/0212957 A1    Jul. 7, 2022

Related U.S. Application Data

(60) Provisional application No. 63/133,500, filed on Jan. 4, 2021.

(51) Int. Cl.
*C02F 1/26* (2023.01)
*B01D 11/04* (2006.01)
(Continued)

(52) U.S. Cl.
CPC ............. *C02F 1/265* (2013.01); *B01D 1/284* (2013.01); *B01D 5/0003* (2013.01); *B01D 5/006* (2013.01);
(Continued)

(58) Field of Classification Search
CPC ........ C02F 1/265; C02F 1/04; C02F 2101/30; C02F 2201/005; C02F 2303/10;
(Continued)

(56) References Cited

U.S. PATENT DOCUMENTS 3,408,290 A * 10/1968 Scheibel ................. C02F 1/265
                                                                203/100
3,424,675 A *  1/1969 Davison ............. B01D 11/0488
                                                                210/511
(Continued)

FOREIGN PATENT DOCUMENTS

AU        2008287823 C1     2/2009
CN        108770346 A  * 11/2018 ............. B01D 11/02
(Continued)

OTHER PUBLICATIONS

Bajpayee, "Directional Solvent Extraction Desalination", Massachesetts Institute of Technology, published Sep. 2012. (Year: 2012).*

(Continued)

*Primary Examiner* — Joseph W Drodge
(74) *Attorney, Agent, or Firm* — Modern Times Legal; Robert J. Sayre (57) ABSTRACT

A saline feed stream flows into a liquid-liquid extraction system; and a volatile organic solvent flows through a main compressor. The compressed volatile organic solvent then flows through a solvent regenerator, which can be a heat exchanger or a combination of a vaporization device and a condenser, to cool the volatile organic solvent. The cooled volatile organic solvent in liquid phase then flows into the liquid-liquid extraction system, where the saline feed stream contacts the volatile organic solvent to selectively extract water from the saline feed stream into the volatile organic solvent, producing a concentrated brine and an organic-rich mixture of water and the volatile organic solvent. The (Continued)

organic-rich mixture flows from the liquid-liquid extraction system into the solvent regenerator, where the organic-rich mixture is heated to produce an organic-rich vapor and desalinated water; and the organic-rich vapor is recycled as volatile organic solvent back into the liquid-liquid extraction system.

17 Claims, 3 Drawing Sheets

(51) Int. Cl.
  *B01D 5/00* (2006.01)
  *C02F 1/04* (2023.01)
  *B01D 1/28* (2006.01)
  *C02F 101/30* (2006.01)
(52) U.S. Cl.
  CPC ...... *B01D 11/0488* (2013.01); *B01D 11/0492* (2013.01); *C02F 1/04* (2013.01); *C02F 2101/30* (2013.01); *C02F 2201/005* (2013.01); *C02F 2303/10* (2013.01)
(58) Field of Classification Search
  CPC ... C02F 2103/08; B01D 1/284; B01D 5/0003; B01D 5/006; B01D 11/0488; B01D 11/0492; B01D 3/40; B01D 9/004; B01D 9/0054; B01D 11/028; B01D 11/0296; B01D 11/0411; B01D 1/28; B01D 11/0203; B01D 11/0288; B01D 11/0292; B01D 2011/002; B01D 2011/007; B03D 1/14; B03D 1/145
  See application file for complete search history.

(56) References Cited

U.S. PATENT DOCUMENTS

| | | | |
|---|---|---|---|
| 4,261,818 A * | 4/1981 | Sweeney | B01D 11/0488 210/511 |
| 5,882,485 A | 3/1999 | Roth et al. | |
| 7,537,700 B2 | 5/2009 | Kanda et al. | |
| 8,048,304 B2 | 11/2011 | Waibel et al. | |
| 8,383,845 B2 | 2/2013 | Catchpole et al. | |
| 9,399,194 B2 | 7/2016 | Wilson et al. | |
| 10,195,543 B2 | 2/2019 | Wilson et al. | |
| 10,363,336 B2 | 7/2019 | Wilson et al. | |
| 2009/0166175 A1* | 7/2009 | Waibel | B01D 11/028 202/185.1 |
| 2011/0108481 A1* | 5/2011 | Bajpayee | C02F 1/265 210/642 |
| 2017/0183377 A1 | 6/2017 | Caulfield | |
| 2018/0001226 A1* | 1/2018 | Sano | F26B 5/16 |
| 2020/0298142 A1* | 9/2020 | Sano | B01D 11/0492 |
| 2021/0077919 A1* | 3/2021 | Sano | B01D 36/00 |

FOREIGN PATENT DOCUMENTS

| | | |
|---|---|---|
| JP | 2014161826 A | 9/2014 |
| WO | 2019070526 A1 | 4/2019 |
| WO | 2019191553 A1 | 10/2019 |

OTHER PUBLICATIONS

English Translation of Stantchev Patent Publication, CN108770346A, published Nov. 2018. (Year: 2018).*

* cited by examiner

SWITCHABLE SYSTEM FOR HIGH-SALINITY BRINE DESALINATION AND FRACTIONAL PRECIPITATION

RELATED APPLICATION

This application claims the benefit of U.S. Provisional Application No. 63/133,500, filed 4 Jan. 2021, the entire content of which is incorporated herein by reference.

GOVERNMENT SUPPORT

This invention was made with government support under Grant No. DE-AC07-05ID14517 awarded by the Department of Energy. The Government has certain rights in the invention.

BACKGROUND

The discussion of the background state of the art, below, may reflect hindsight gained from the disclosed invention(s); and these characterizations are not necessarily admitted to be prior art.

With new technologies and increasing ecological concerns, demands are increasing for responsible water usage and remediation are increasing. In addition to conventional water desalination from, e.g., seawater and brackish water, a variety of other contexts require separation of dissolved components from aqueous water sources.

In one prominent example, unconventional oil and gas extraction results in "produced water" after water is pumped underground to extract oil and gas from underground reservoirs. Removal of dissolved salts and other components from the produced water enables the concentration of waste and the production of purified water that can be reused in this context or in other applications.

In another example, aqueous mixtures are produced from a variety of mining operations and other metal extraction processes where it is advantageous to remove dissolved solutes from aqueous mixture. These operations include the separation of lithium from salt lakes, magnesium recovery from brines, and the extraction of rare earth elements from ground water or seawater.

In yet another example, the drying of suspensions or slurries containing nonvolatile solids involves the separation of water for the nonvolatile solids. One such example is in drying solid biomass fuel.

Still further, selected organic compounds are advantageously extracted from an aqueous-organic-electrolyte mixture. Particular examples include the extraction of organic compounds, such as sugars and alcohols, from liquified biomass or biofuel-containing fermentation broth.

SUMMARY

A switchable system for desalination and fractional precipitation and a method therefore are described herein, where various embodiments of the apparatus and methods may include some or all of the elements, features and steps described below.

In a method for desalination and fractional precipitation, a saline feed stream flows into a liquid-liquid extraction system; and a volatile organic solvent flows through a main compressor, where the volatile organic solvent is compressed. The volatile organic solvent then flows through a solvent regenerator, which can be a heat exchanger or a combination of a vaporization device and a condenser, to cool the volatile organic solvent. If the solvent regenerator is a vaporization device and condenser, the volatile organic solvent flows through the condenser. The cooled volatile organic solvent in liquid phase then flows into the liquid-liquid extraction system, where the saline feed stream contacts the volatile organic solvent to selectively extract water from the saline feed stream into the volatile organic solvent to produce a concentrated brine and an organic-rich mixture of water and the volatile organic solvent. The organic-rich mixture flows from the liquid-liquid extraction system into the solvent regenerator, wherein, if the solvent regenerator is a vaporization device and condenser, the organic-rich mixture flows through the vaporization device. The organic-rich mixture is heated in the solvent regenerator to produce an organic-rich vapor and desalinated water; and the organic-rich vapor is recycled as volatile organic solvent through the main compressor, through the solvent regenerator, and back into the liquid-liquid extraction system.

In particular exemplifications, the volatile organic solvent comprises dimethyl ether. A feed of the volatile organic solvent can be passed through a secondary compressor to initially compress the volatile organic solvent before being further compressed in the main compressor, while recycled organic-rich vapor can be compressed in the main compressor but not in the secondary compressor.

A switchable system for desalination and fractional precipitation, as described above, comprises a liquid-liquid extraction system and a mechanical-vapor-compression regenerator. The liquid-liquid extraction system includes (a) a volatile-organic-solvent inlet into which a volatile organic solvent can be fed; (b) a saline-feed inlet into which a saline feed stream can be fed, wherein the liquid-liquid extraction system is configured to extract water—from a saline feed stream fed through the saline-feed inlet—into volatile organic solvent fed through the volatile-organic-solvent inlet; (c) a brine outlet through which a concentrated brine, produced from the saline feed stream after water is extracted from the saline feed, can leave the system; and (d) an organic-rich-mixture outlet through which an organic-rich mixture containing the extracted water can leave the system. The mechanical-vapor-compression regenerator includes (a) a main compressor; and (b) a solvent regenerator selected from (i) a heat exchanger and (ii) a vaporization device and a condenser. The solvent regenerator includes (a) an organic-rich-mixture inlet in fluid communication with the organic-rich-mixture outlet of the liquid-liquid extraction system, wherein the solvent regenerator is configured to vaporize dissolved organic compounds from the organic-rich mixture to produce an organic-rich vapor and to leave liquid-phase desalinated water; (b) an organic-rich-vapor outlet in fluid communication with the main compressor to feed the organic-rich vapor as volatile organic solvent into the main compressor; (c) a volatile-organic-solvent inlet in fluid communication with the main compressor to feed volatile organic solvent from the main compressor, after compression in the main compressor, into the volatile-organic-solvent inlet to transfer heat to the organic-rich mixture in the solvent regenerator; (d) a volatile-organic-solvent outlet in fluid communication with the volatile-organic-solvent inlet of the liquid-liquid extraction system for recycling the volatile organic solvent to the liquid-liquid extraction system; and (e) a desalinated-water outlet positioned to release the desalinated water from the solvent regenerator.

Where the solvent regenerator comprises the vaporization device and the condenser, the organic-rich mixture inlet, the organic-rich-vapor outlet, and the desalinated water outlet can be included in the vaporization device, while the volatile-organic-solvent inlet and the volatile-organic-solvent outlet can be included in the condenser.

The system and method can be used in a variety of applications, including desalination of high-salinity brines; fractional precipitation of selected salts, such as lithium, magnesium, and rare earth elements; drying suspensions or slurries containing nonvolatile solids, such as solid biomass fuel; and extraction of selected organic compounds, such as sugars and alcohols from liquified biomass or biofuel-containing fermentation broth.

The method and system can offer a variety of advantages, as is further described herein, including reducing the propensity for scaling of foulants at heat-transfer surfaces. Furthermore, the system and method can enable the separation of volatile organic solvents from water using low-grade heat sources at moderate temperatures. The system and method can also increase productivity, which enables a reduced footprint for the system and method. Moreover, the system and method can transfer the latent heat of vaporization released by the condensing volatile organic solvent(s) vapor directly to the organic-rich mixture of aqueous and volatile organic solvent(s), driving the evaporation and separation of the latter. Still further, the system and method can exploit the volatility of the organic solvent(s) to drive their evaporation and separation from water in the organic-rich mixture at low temperatures.

In the accompanying drawings, like reference characters refer to the same or similar parts throughout the different views; and accents are used to differentiate multiple instances of the same item, different embodiments of items, or different phases or stages of a composition/item sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Figure 1:
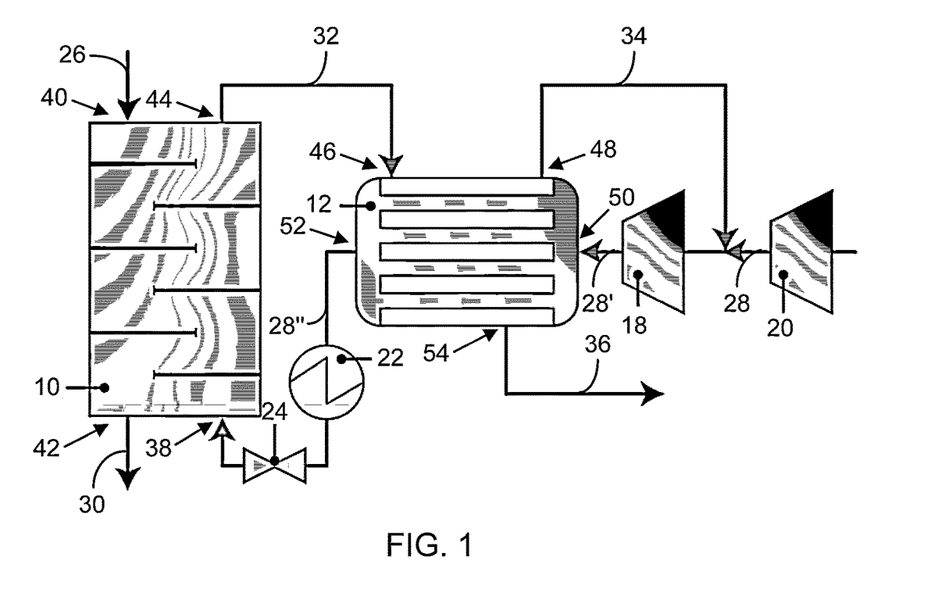
FIG. 1 is a schematic representation of an exemplary liquid-liquid extraction system 10 coupled with a mechanical-vapor-compression generator comprising a solvent regenerator 12, in the form of a heat exchanger, and a pair of compressors 18 and 20, along with an illustration of the liquid flows through conduits to and from the various components.

A schematic representation of an exemplary switchable system, including a liquid-liquid extraction system 10 with a tortuous internal pathway for fluid flow is coupled with a mechanical vapor compression regenerator, including a solvent regenerator 12 in the form of a heat exchanger along with main and secondary compressors 18 and 20, is provided in FIG. 1. A substance is said to be "switchable" if major shifts in the macro-state of the substance can be achieved by "switching" on or off a key constituent of the substance. Here, we achieve the "switching" effect by changing the thermodynamic state of the substance (particularly, the organic solvent), which is attained through the series of turbo-machineries described herein.

The feed stream 26 is pressurized and passed into the liquid-liquid extraction system 10, where it is contacted with volatile organic solvent(s) 28", such as dimethyl ether (DME, $CH_3OCH_3$). The aqueous organic electrolyte mixture in the liquid-liquid-extraction system 10 forms two distinct liquid phases, an aqueous-rich phase, which forms the concentrated brine 30, and an organic-rich phase (mixture) 32 containing water but negligible amounts of dissolved solutes, which flows to the solvent regenerator 12 for separation. In the case of fractional precipitation, volatile organic solvent stream 28" will fully dissolve into the aqueous phase, precipitating solids. In which case, operation of the system 10 will involve a solids-liquids separation, though we still refer to it as a liquid-liquid extraction system, and the concentrated brine stream 30 will be at least in part solids. The organic-rich mixture 32 enters the solvent regenerator (a heat exchanger) 12, which may comprise multiple stages, as shown in FIG. 3, where the volatile organic solvent evaporates preferentially leaving behind desalinated water 36, which has a relatively low concentration of dissolved organic solvent. The organic-rich vapor 34 produced as the volatile organic solvent(s) evaporates is mixed with additional volatile organic solvent(s) 28 upstream from the main compressor 18, if required. The fresh volatile organic solvent(s) 28 is pressurized using a secondary compressor 20 prior to mixing with the organic-rich vapor 34. The combined stream of volatile organic solvent 28 then enters the main compressor 18 and is pressurized further before entering the solvent regenerator 12 in which it condenses as heat is transferred from the pressurized organic solvent 28' to the organic-rich mixture. The resulting liquid-phase volatile organic solvent(s) 28" is then cooled further in a cooler 22 before being partially depressurized using a valve 24 or energy recovery device (ERD). Any of a range of ERDs, including turbines and rotary pressure exchangers, may be used. The cooled and partially depressurized volatile organic solvent(s) 28" then flows into the liquid-liquid extraction system 10. Among the embodiments disclosed are methods and systems to regenerate dimethyl ether (DME) from a mixture of DME and Water (aqueous or organic) for water treatment and drying applications by efficiently vaporizing and condensing DME out of the mixture. In an alternative embodiment, shown in FIG. 2, the valve 24 or energy recovery device is instead placed downstream from the liquid-liquid extraction system 10 in the conduit for the organic-rich mixture 32. Placing the valve 24 or energy recovery device in the organic-rich-mixture stream 32 allows the heat exchanger or regenerator 12 to be adiabatically cooled. Thus, the output streams of desalinated water 36, volatile organic solvent 28", and concentrated brine 30 will all be lower in temperature (limited by their freezing point) than the feed stream 26, thereby using the thermal energy found in the feed stream 26.

Although DME is used in the particular examples recited herein, other exemplifications of the method can use one or more other compositions that can selectively extract water and then be separated via vaporization from the extracted water in this context. Suitable volatile organic solvents for use in accordance with the methods described herein can include one or more compositions selected from the following: methanol, ethanol, propan-1-ol, propan-2-ol, butan-1-ol, acetone, butan-2-one, tetrahydrofuran, 1,4-dioxane, dimethyl ether, diethyl ether, trimethyl amine, ethyl amine, isopropyl amine, acetonitrile, dimethyl sulfoxide, formamide, and dimethylformamide.

Figure 2:
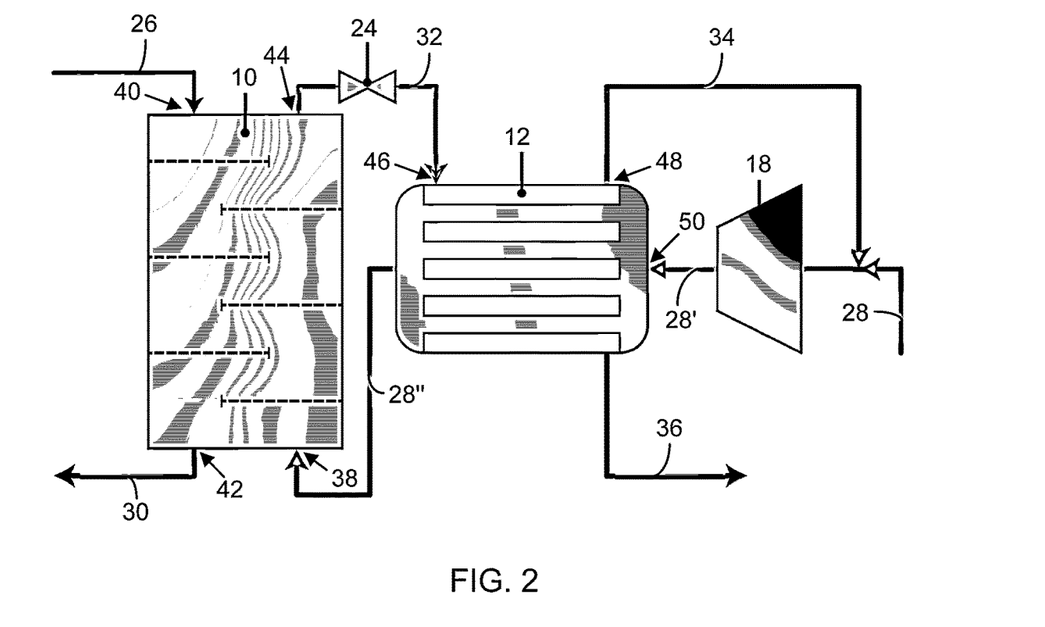
FIG. 2 is a schematic representation of an exemplary liquid-liquid extraction system 10 coupled with a mechanical-vapor-compression generator, similar to FIG. 1, except with the valve 24 moved to the conduit for the organic-rich mixture 32.
Figure 3:
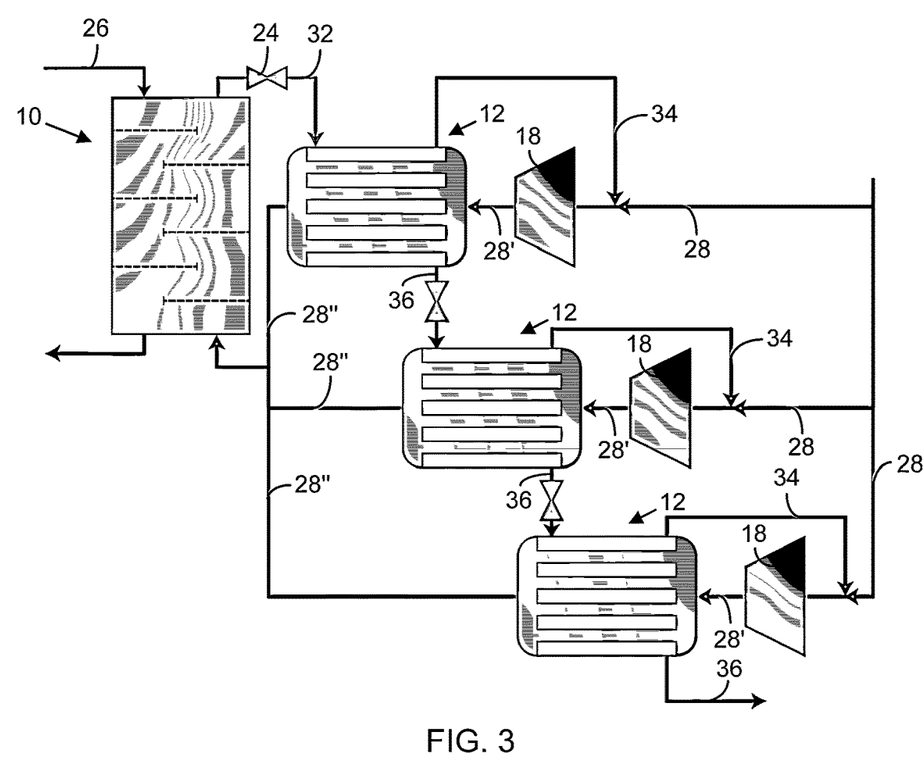
FIG. 3 is a schematic representation of an exemplary liquid-liquid extraction system 10 coupled with a mechanical-vapor-compression generator comprising three stages of heat exchangers 12 and compressors 18, along with an illustration of the liquid flows through conduits to and from the various components.

In the embodiments shown in FIGS. 1 and 2, a liquid-liquid extraction system 10 coupled with a mechanical vapor compression regenerator allows the desalination and concentration of high-salinity brines and the selective fractional precipitation of solutes. In the liquid-liquid extraction system 10, water can be extracted from the saline feed (an aqueous-inorganic electrolyte mixture) stream 26 into a volatile organic solvent 28", such as dimethyl ether, or a mixture of volatile organic solvents, producing a concentrated brine stream 30 and an organic-rich mixture 32 containing water. Desalinated water 36 can then be separated from the organic-rich mixture 32 in the heat exchanger 12, leaving volatilized organic solvent (in an organic-rich vapor 34) to be recycled back through the heat exchanger 12 into the liquid-liquid extraction system 10. The heat exchanger 12 can be used to recover a large portion of the energy required to evaporate the organic solvent from the organic-rich mixture (also containing water) 32. Applications of the embodiments, such as a liquid-liquid extraction mechanical vapor compression system, include the following.

First, the system and methods described herein can be used for desalination or concentration of high-salinity brines, including produced water from unconventional oil and gas extraction, brine from inland brackish water reverse osmosis, cooling tower blowdown water, industrial wastewater from the chemicals and agricultural industries. The desalinated or product water can have a significantly lower concertation of dissolved electrolytes (or salts) than the saline feed stream, while the concentrated brine can have a higher concentration of dissolved electrolytes.

Second, the system and methods can be used for fractional precipitation of selected salts from an aqueous mixture containing several dissolved solutes, including the separation of lithium from salt lakes, magnesium recovery from brines, and the extraction of rare earth elements from ground water, seawater, or other solutions, such as leachate from mined ore or another preprocessed stream. The concentrated brine can comprise a suspension containing solid crystals of a selected solute, while the product water can have a negligible concentration of all dissolved solutes. The solid salt crystals can then be separated from the suspension or slurry using, for example, a settler or a filter.

Third, the system and methods can be used for drying suspensions or slurries containing nonvolatile solids, including the drying of solid biomass fuel. The concentrated stream can comprise suspensions with a significantly lower water content than the feed suspension or slurry. The nonvolatile solid particles can then be separated from the suspension or slurry using, for example, a settler or a filter.

Fourth, the system and methods described herein can be used for extraction of selected organic compounds from an aqueous-organic-electrolyte mixture, including the extraction of organic compounds, such as sugars and alcohols from liquified biomass or biofuel-containing fermentation broth. The product stream can have a higher concentration of certain organic compounds compared to the feed stream.

Extraction of water from a saline feed stream 26 or the bulk precipitation of solutes in a liquid-liquid extraction system 10 can reduce inorganic fouling, particularly scaling, on heat transfer surfaces in a mechanical vapor compression regenerator or separator. Reducing or eliminating scaling, because scaling has a detrimental impact on process equipment, would reduce maintenance and cleaning costs, obviate the need for expensive corrosion-resistant materials, and enable the treatment of higher-salinity feed streams 26 with existing equipment.

In a selective fractional precipitation application, the liquid-liquid separator-based system can have a reduced areal footprint compared to other systems used with current processes, which often require large evaporation ponds. A compact fractional precipitation system can greatly increase the productivity, mass of precipitated salt recovered per unit areal footprint of separation system, of selective precipitated mineral recovery.

Liquid-Liquid Extraction System and Mechanical Vapor-Compression Regenerator System Design:

The schematic illustration provided in FIG. 1 highlights an example of the main process equipment for various applications, such as the desalination or concentration of high-salinity brines and selective fractional precipitation of solutes. A feed stream 26, comprising an aqueous-inorganic electrolyte mixture of water and dissolved salts, can be pressurized to a hydraulic pressure ranging from 1 to 15 bar absolute before entering the liquid-liquid extraction system 10. The solute concentration in the feed stream 26 may vary from no solute to the saturation point of the particular solute in water (0 to 26% by weight for sodium chloride). The temperature of the feed stream 26 may vary from 5 to 50° C.

In the liquid-liquid extraction system 10, the feed stream 26 can be mixed with volatile organic solvent(s) 28" at the same hydraulic pressure as the feed 26, ranging from 1 to 15 bar absolute. The aqueous-organic-electrolyte mixture in the liquid-liquid extraction system 10 can form two liquid phases, an aqueous-rich phase (discharged as the concentrated brine 30), which can contain water, dissolved solutes, and comparatively small amounts of the volatile organic solvent(s), and an organic-rich mixture 32, which can contain a much higher concentration of the volatile organic solvent(s) as well as water, along with negligible amounts of electrolytes or inorganic solutes. The concentrated brine 30 may then be used as a liquid stream in, for example, desalination and concentration applications or a suspension of solids in a liquid in, for example, selective fractional precipitation applications.

The organic-rich mixture 32 can exit the liquid-liquid extraction system 10 and enter the solvent regenerator 12. In this case, the solvent regenerator 12 is a heat exchanger in which the organic-rich mixture 32 can be brought into thermal contact with pressurized volatile organic solvent(s) 28 in the vapor phase. In the heat exchanger 12, heat can be transferred from condensing volatile organic solvent(s) 28 to the organic-rich mixture 32, which can cause the evaporation of volatile organic solvent(s) from the latter, generating an organic-rich vapor phase 34, containing small amounts of water, and a water-rich liquid phase (i.e., desalinated water) 36, containing no more than small amounts of volatile organic solvent(s). The temperature in the heat exchanger 12 may range from 253 to 303 K (−20 to 30° C.) higher than the temperature of the liquid-liquid extraction system 10. The hydraulic pressure on the volatile organic solvent(s) vapor side of the heat exchanger 12 may be 0.5 to 2.0 bar higher than that on organic-rich-mixture side, with the pressure on the organic-rich-mixture side being similar to the pressure in the liquid-liquid extraction system 10. The solvent regenerator 12 [whether in the form of a heat exchanger or other device(s)] may be staged, as shown in FIG. 3, with the composition, temperature, and pressure changing in each stage. As shown in FIG. 3, the desalinated water 36 from a first-stage heat exchanger 12 (top) is introduced as the feed into the second-stage heat exchanger 12 (middle); and the desalinated water 36 from the second-stage heat exchanger 12 is introduced as the feed into the third-stage heat exchanger 12 (bottom) to achieve a greater-purity desalinated water 36 product with each successive stage.

The water-rich liquid phase can exit the solvent regenerator 12 as the desalinated or product water stream 36. To compensate for any volatile organic solvent(s) lost in the concentrated brine 30 or desalinated water 36, a dry stream of volatile organic solvent(s) 28 in vapor phase can be pressurized to the same hydraulic pressure as the organic-rich vapor 34 by a secondary compressor 20. The organic-rich vapor 34 and the pressurized fresh volatile organic solvent(s) 28 can then be mixed forming a combined stream of volatile organic solvent 28', which can be pressurized further by a main compressor 18, which can increase its hydraulic pressure by, for example, 0.1 to 10.0 bar. The pressurized stream of volatile organic solvent(s) vapor 28' can then enter the heat exchanger 12. Heat can be transferred away to the evaporating organic-rich mixture 32, causing the volatile organic solvent(s) vapor to condense forming a liquid stream 28". The temperature of the volatile organic solvent(s) vapor side of the heat exchanger 12 can be 0 to 20 K higher than the temperature of the organic-rich mixture 32. The liquid volatile organic solvent(s) 28" can be below the temperature of the feed stream 26. Alternatively, if elevated in temperature, the liquid volatile organic solvent(s) 28" can be further cooled to approximately the temperature of the liquid-liquid extraction system 10 in a cooler 22. The cooled volatile organic solvent(s) stream 28" can then be passed through a valve 24 or energy-recovery device, such as a turbine or a rotary pressure exchanger, to lower its hydraulic pressure until, for example, it is equal to the pressure in the liquid-liquid extraction system 10. The cooled and partially depressurized volatile organic solvent(s) 28" can then be recycled into the liquid-liquid extraction system 10.

Phase Equilibrium in the Liquid-Liquid Extraction System:

The liquid-liquid extraction system 10 can bring two liquid phases into contact. Provided the residence time for fluid flow through the liquid-liquid extraction system 10 is sufficient, mass and heat can be transferred between the two phases as both phases progress toward thermodynamic equilibrium with each other. For mixtures containing water, the liquid phases can comprise an aqueous-rich phase and an organic-rich phase. For high-salinity brine desalination or concentration and fractional precipitation applications, the liquid-liquid extraction system 10 can contain an aqueous-organic-electrolyte mixture comprising water, volatile organic solvent(s), and dissolved electrolytes or salts.

Figure 4:
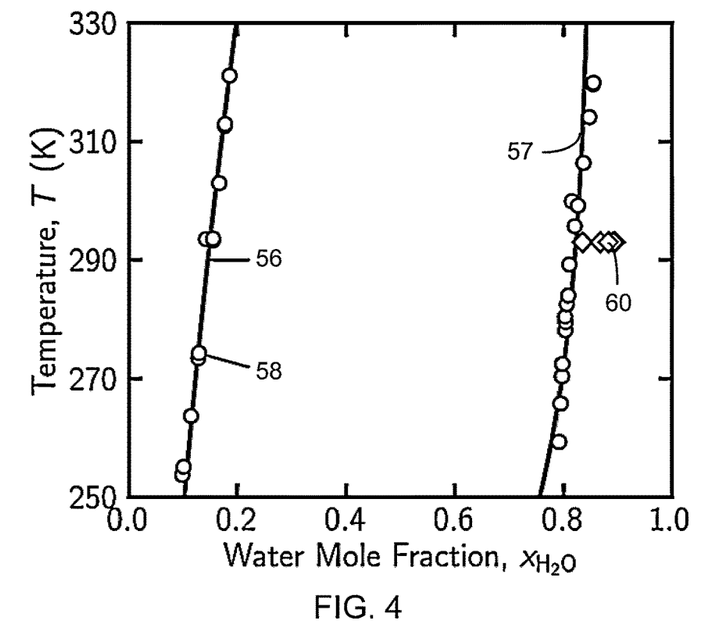
FIG. 4 is a plot of an exemplary liquid-liquid phase equilibrium composition in an aqueous-organic-electrolyte mixture of water-dimethyl-ether (DME) sodium chloride (NaCl) as a function of temperature, where universal quasichemical (UNIQUAC) activity coefficient model (solid curves 56 and 57) parameters are obtained from the regression of experimental water-DME data (open circles 58), and where experimental water-DME-NaCl data is also shown (as open diamonds 60).

A plot, provided in FIG. 4, indicates the equilibrium water composition by mole fraction of the two liquid phases (i.e., the organic-rich vapor phase 56 and the water-rich aqueous phase 57) that form when water and dimethyl ether (DME), an organic solvent, are mixed and allowed to phase separate at different temperatures. The universal quasichemical (UNIQUAC) activity coefficient model is used to regress the experimental data (open circles 58) enabling the numerical simulation of equilibrium phase composition (solid curves 56 and 57 for the two compositions). Also shown is experimental water-DME-NaCl data (as open diamonds 60). Using this phase equilibrium data and the regressed UNIQUAC model, the water and DME composition of the organic-rich mixture 32 exiting the liquid-liquid extraction system 10 may be calculated as a function of the flow rate and composition of the feed stream 26 and volatile organic solvent(s) 28" into the liquid-liquid extraction system 10. For example, at a temperature of 320 K with equal flow rates of the feed stream 26 and the volatile organic solvent 28"; the organic-rich mixture 32 exiting the liquid-liquid extraction system 10 includes 18.4% water by mole, which corresponds to 8.1% water by mass.

Energy Consumption of Vapor Compressor:

The volatile organic solvent(s) contained in the organic-rich mixture 32 that exits the liquid-liquid extraction system 10 can be evaporated in the solvent regenerator 12 forming an organic-rich vapor phase 34. The latent heat of vaporization required for this evaporation process can be provided by the condensation of a pressurized stream of volatile organic solvent(s) vapor 28'. The hydraulic pressure of the pressurized stream of volatile organic solvent(s) vapor 28' can be 0.1 to 10.0 bar greater than that of the organic-rich mixture 32 from the liquid-liquid extraction system 10. Increased pressure elevates the boiling point of the volatile organic solvent vapor 28' (or the dew point of a vapor-phase mixture of volatile organic solvents), allowing the condensing volatile organic solvent(s) 28'/28" to transfer heat to the evaporating solvent(s) of the organic rich mixture 32, thereby producing the organic-rich vapor 34. The electrical work required to drive the main compressor 18 to increase the pressure of the volatile organic solvent 28/28' constitutes a main source of energy consumption in the exemplary system.

The energy consumption of the main compressor 18 is determined by calculating the isentropic compression work required and applying an isentropic compressor efficiency of 70%. Isentropic compression work calculations use the Peng-Robinson Stryjek-Vera equation of state for vapor-phase DME to compute the molar volume as a function of pressure and temperature. The equilibrium water content of the organic-rich phase from FIG. 4 is used to determine the mass flow rate of DME that passes through the main compressor 18 per unit mass flow rate of water produced. For example, at a temperature of 320 K, 11.3 kg of DME must be pressurized by the main compressor 18 for every 1 kg of desalinated water produced.

Figure 5:
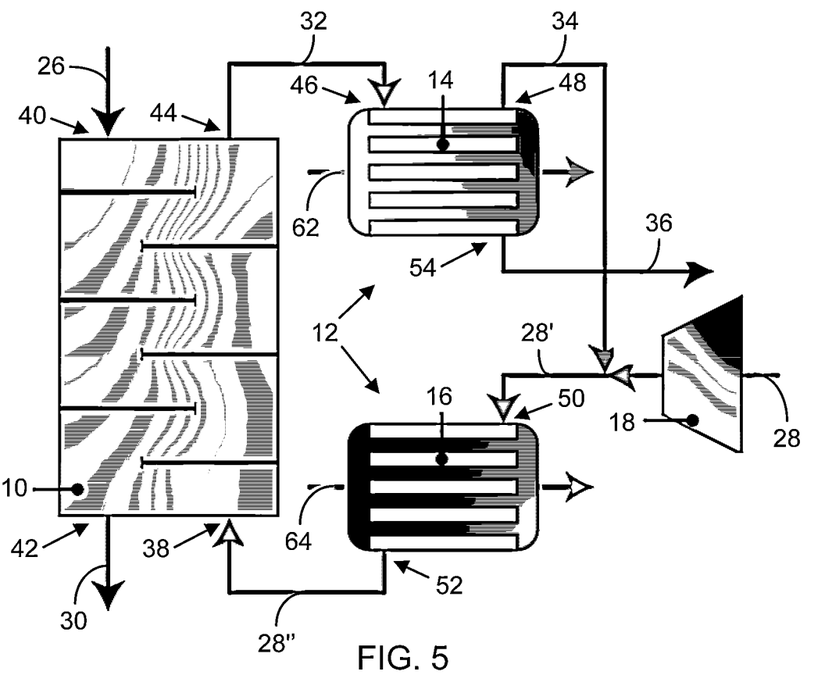
FIG. 5 is a schematic representation of an exemplary liquid-liquid extraction system 10 coupled with a mechanical-vapor-compression generator comprising a solvent regenerator, including a vaporization device 14 and a condenser 16, and a compressor 18, along with an illustration of the liquid flows through conduits to and from the various components.

Liquid-Liquid Separator Coupled with Low-Grade Heat Regenerator System Design:

An alternative exemplary design incorporating a low-grade heat source to regenerate the volatile organic solvent(s) is shown in FIG. 5. The feed stream 26, comprising an aqueous-inorganic electrolyte mixture of water and dissolved salts, can be pressurized to a hydraulic pressure ranging from 1 to 15 bar absolute before entering the liquid-liquid extraction system 10. In the liquid-liquid extraction system 10, which is as described in the exemplification of FIGS. 1 and 2, the feed 26 can be contacted with volatile organic solvent(s) 28", such as dimethyl ether (DME, Stream 9). The aqueous organic electrolyte mixture can form two liquid phases, an aqueous-rich phase, which forms the concentrated brine 30, and an organic-rich mixture 32 containing water but negligible amounts of dissolved solutes, which flows to a vaporization device 14 (e.g., a boiler or other form of heater for vaporizing a component of the liquid either via boiling or via evaporation without bubble formation) for separation. The vaporization device 14 can again comprise multiple stages. The vaporization device 14 can be powered by sub-ambient, ambient, low-grade, or waste heat from a warm-liquid stream 62 (e.g., at 20-57° C.) and may comprise multiple stages. In the vaporization device 14, the volatile organic solvent(s) can be vaporized to produce organic-rich vapor 34, leaving the desalinated or product water 36 in the liquid phase. To compensate for losses elsewhere in the system, the organic-rich vapor 34 can be mixed with dry additional vapor-phase organic solvent 28, which can be compressed to the operating pressure of the liquid-liquid extraction system 10 by the main compressor 18. The augmented and pressurized volatile organic solvent(s) vapor 28' can be liquified in a condenser 16 using a coolant 64, and the liquid-phase volatile organic solvent(s) 28" can be recycled into the liquid-liquid extraction system 10. Depending on the volatile organic solvent(s) 28 used, heating fluid temperatures can range from 253 K (-20° C.) to 350 K (77° C.). In this exemplification, the vaporization device 14 and condenser 16, together, constitute the solvent regenerator 12 and perform a function similar to the solvent regenerator 12, in the form of the heat exchanger, in the exemplification shown in FIGS. 1 and 2.

Example Advantages and Improvements

First, precipitation of sealants can occur in the bulk aqueous-rich phase of the liquid-liquid extraction system 10, away from heat- or mass-transfer surfaces, including heat-exchange surfaces for thermal separation processes and membrane surfaces for membrane-based separations. The organic-rich mixture 32 that may contact heat-exchange surfaces, can have a substantially lower scaling potential as the concentration of electrolyte solute ions, particularly key scale-forming divalent ions, can be negligible.

In particular, substantial reductions in scaling and inorganic fouling can drastically reduce maintenance costs by reducing the need for cleaning, which may otherwise necessitate plant shut down and pre-treatment involving the use of anti-sealants and pH modulation. With the systems and methods described herein, volatile organic solvents can be recovered and recycled in a closed loop, minimizing chemical consumption compared to conventional water treatment by reducing the need for cleaning and anti-scaling chemicals.

Moreover, the reduced scaling potential can reduce the capital costs of process equipment by obviating the need for expensive corrosion-resistant materials and coatings. In some embodiments, by reducing the concentration of electrolytes passing through the solvent regenerator 12 to negligible levels, the system can exploit cheaper materials to achieve the same process performance.

Furthermore, decoupling the scaling potential of the fluid that passes through the solvent regenerator 12 from that of the feed stream 26 can allow the described systems to treat high-salinity feed streams 26 with extraordinarily high concentrations of sealants. The desalination and concentration of high-salinity brines, particularly from inland brackish-water reverse osmosis and produced water from unconventional hydrocarbon extraction and solution mining, is often limited by the scaling potential of the feed. The described system can allow these high-scaling and high-fouling brines to be treated in an energy efficient manner.

Second, volatile organic solvents can be separated (in organic-rich vapors 34) from water 36 using very-low-grade heat sources with temperatures as low as 253 K (−20° C.). The use of highly volatile organic solvents such as DME, which has a boiling point of 249 K (−24° C.), can be highly advantageous in areas where low-grade heat is available.

Third, the increased productivity, defined as water produced per unit time per unit plant area, of the described system can drastically lower the areal footprint of selective fractional precipitation processes, which often use large evaporation ponds. Interactions between the electrolyte ions and volatile organic solvent(s) can also be leveraged to alter the solution behavior of certain electrolytes or salts facilitating their selective separation.

Fourth, the system described in FIGS. 1-3 can transfer the latent heat of vaporization released by the condensing volatile organic solvent(s) vapor directly to the organic-rich mixture of aqueous and volatile organic solvent(s), driving the evaporation and separation of the latter. By combining the vaporization device 14 and condenser 16 into a single heat exchanger 12, the regeneration system can remove the need for an external refrigerant cycle 64, which requires two heat exchangers, to pump heat from the condenser 16 to the vaporization device 14. This exemplification with a combined boiler-condenser system thus reduces capital cost, requiring fewer heat exchangers, and reduces energy consumption by minimizing the compressor pressure ratio required.

Fifth, the system described in FIG. 4 can exploit the volatility of the organic solvent(s) to drive their evaporation and separation from water in the organic-rich mixture 32 at low temperatures ranging from 253 K (−20° C.) to 350 K (77° C.) for DME. The use of low-grade heat to power the separation process can reduce energy costs by enabling the exploitation of underutilized waste heat sources or even supply a bottoming or cooling capacity.

In describing embodiments, herein, specific terminology is used for the sake of clarity. For the purpose of description, specific terms are intended to at least include technical and functional equivalents that operate in a similar manner to accomplish a similar result. Additionally, in some instances where a particular embodiment includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $1/100^{th}$, the value of the parameter may be in a range from 0.99 to 1.01), unless otherwise specified. Further still, where methods are recited and where steps/stages are recited in a particular order—with or without sequenced prefacing characters added for ease of reference—the steps/stages are not to be interpreted as being temporally limited to the order in which they are recited unless otherwise specified or implied by the terms and phrasing.

While this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention.

What is claimed is:

1. A method for desalination using a switchable volatile organic solvent, comprising:

flowing a saline feed stream into a liquid-liquid extraction system;

flowing a volatile organic solvent in a vapor phase through a main compressor;

compressing the vapor-phase volatile organic solvent in the main compressor;

flowing the volatile organic solvent through a solvent regenerator to cool and condense the vapor-phase volatile organic solvent, wherein the solvent regenerator is selected from (a) a heat exchanger providing vaporization and condensation and (b) a vaporization device and a condenser;

flowing the cooled volatile organic solvent in a liquid phase into the liquid-liquid extraction system;

contacting the saline feed stream with the liquid-phase volatile organic solvent in the liquid-liquid extraction system to selectively extract water from the saline feed stream into the volatile organic solvent to produce a concentrated brine and an organic-rich mixture of water and the volatile organic solvent in the liquid phase;

flowing the liquid-phase organic-rich mixture from the liquid-liquid extraction system into the solvent regenerator;

heating the liquid-phase organic-rich mixture in the solvent regenerator to produce an organic-rich vapor and desalinated water; and recycling the organic-rich vapor as volatile organic solvent through the main compressor, through the solvent regenerator, and back into the liquid-liquid extraction system, wherein, if the solvent regenerator is the vaporization device and the condenser, the volatile organic solvent flows through the condenser, and the organic-rich mixture flows through the vaporization device.

2. The method of claim 1, wherein the volatile organic solvent comprises dimethyl ether.

3. The method of claim 1, wherein the solvent regenerator is the heat exchanger.

4. The method of claim 1, wherein the solvent regenerator comprises the vaporization device and the condenser.

5. The method of claim 1, further comprising controlling the flow of the cooled volatile organic solvent into the liquid-liquid extraction system using a valve.

6. The method of claim 1, further comprising further cooling the cooled volatile organic solvent between the solvent regenerator and the liquid-liquid extraction system.

7. The method of claim 1, further comprising passing the volatile organic solvent through a secondary compressor to initially compress the volatile organic solvent before being further compressed in the main compressor.

8. The method of claim 7, wherein the recycled organic-rich vapor is compressed in the main compressor but not in the secondary compressor.

9. The method of claim 1, further comprising fractionally precipitating salt from the concentrated brine.

10. A system for desalination using a switchable volatile organic solvent, the method comprising:
a liquid-liquid extraction system, including:
(A) a volatile-organic-solvent inlet into which a volatile organic solvent can be fed;
(B) a saline-feed inlet into which a saline feed stream is fed, wherein the liquid-liquid extraction system is configured to extract water from a saline feed stream that is fed through the saline-feed inlet into volatile organic solvent that is fed through the volatile-organic-solvent inlet;
(C) a brine outlet through which a concentrated brine, produced from the saline feed stream after water is extracted from the saline feed stream, leaves the system; and
(D) an organic-rich-mixture outlet through which an organic-rich mixture containing the extracted water leaves the system;
a mechanical-vapor-compression regenerator, including:
(A) a main compressor; and
(B) a solvent regenerator selected from (i) a heat exchanger providing vaporization and condensation and (ii) a vaporization device and a condenser, the solvent regenerator including:
(a) an organic-rich-mixture inlet in fluid communication with the organic-rich-mixture outlet of the liquid-liquid extraction system, wherein the solvent regenerator is configured to vaporize dissolved organic compounds from the organic-rich mixture to produce an organic-rich vapor and to leave liquid-phase desalinated water;
(b) an organic-rich-vapor outlet in fluid communication with the main compressor to feed the organic-rich vapor as volatile organic solvent into the main compressor;
(c) a volatile-organic-solvent inlet in fluid communication with the main compressor to feed volatile organic solvent in a vapor form from the main compressor, after compression in the main compressor, into the volatile-organic-solvent inlet to transfer heat to the organic-rich mixture in a liquid form in the solvent regenerator;
(d) a volatile-organic-solvent outlet in fluid communication with the volatile-organic-solvent inlet of the liquid-liquid extraction system for recycling the volatile organic solvent in the liquid form to the liquid-liquid extraction system; and
(e) a desalinated-water outlet positioned to release the desalinated water from the solvent regenerator.

11. The switchable system of claim 10, further comprising a valve or energy-recovery device configured to control fluid flow between the liquid-liquid extraction system and the solvent regenerator in at least one of (a) a conduit from the organic-rich-mixture outlet of the liquid-liquid extraction system to the organic-rich mixture inlet of the solvent regenerator and (b) a conduit from the volatile organic-solvent outlet of the solvent regenerator to the volatile-organic-solvent inlet of the liquid-liquid separator.

12. The switchable system of claim 10, further comprising:
a source of the volatile organic solvent; and
a secondary compressor in fluid communication with the main compressor and with the source of volatile organic solvent and configured to initially compress volatile organic solvent from the source of volatile organic solvent before further compression in the main compressor before entering the volatile-organic solvent inlet of the solvent regenerator.

13. The switchable system of claim 10, further comprising a cooler in a conduit from the volatile-organic-solvent outlet of the solvent regenerator to the volatile-organic-solvent inlet of the liquid-liquid extraction system and configured to cool volatile organic solvent flowing therethrough.

14. The switchable system of claim 10, further comprising a saline solution in fluid communication with the saline-feed inlet of the liquid-liquid extraction system.

15. The switchable system of claim 10, wherein the volatile organic solvent comprises dimethyl ether.

16. The switchable system of claim 10, wherein the solvent regenerator is the heat exchanger.

17. The switchable system of claim 10, wherein the solvent regenerator comprises the vaporization device and the condenser, and wherein:
the organic-rich mixture inlet, the organic-rich-vapor outlet, and the desalinated water outlet are included in the vaporization device; and
the volatile-organic-solvent inlet and the volatile-organic-solvent outlet are included in the condenser.

* * * * *